G. SAUPE.
FLAT WARP KNITTING FRAME.
APPLICATION FILED DEC. 18, 1914.

1,218,212.

Patented Mar. 6, 1917.
10 SHEETS—SHEET 1.

UNITED STATES PATENT OFFICE.

GEORG SAUPE, OF LIMBACH, GERMANY, ASSIGNOR TO THE FIRM, ERNST SAUPE, OF LIMBACH, GERMANY.

FLAT-WARP-KNITTING FRAME.

1,218,212.   Specification of Letters Patent.   Patented Mar. 6, 1917.

Application filed December 18, 1914. Serial No. 877,968.

*To all whom it may concern:*

Be it known that I, GEORG SAUPE, a citizen of the German Empire, residing a Limbach, in the Kingdom of Saxony, Germany, have invented certain new and useful Improvements in Flat-Warp-Knitting Frames; and I do hereby declare the following to be a full, clear, and exact description of the invention, such as will enable others skilled in the art to which it appertains to make and use the same.

My invention relates to improvements in flat warp knitting frames, and the object of the improvements is to provide a frame of this class by means of which fabrics can be made which have the same appearance on both sides, and in which the loops are located in the same line one behind the other, and are made of two warp threads which run in the fabric in opposite directions, each thread running at each side of the fabric and in all the rows of loops in the same direction.

With this and other objects in view my invention consists in the matters to be described hereinafter and particularly pointed out in the appended claims.

For the purpose of explaining the invention several examples embodying the same have been shown in the accompanying drawings, in which the same letters of reference have been used in all the views to indicate corresponding parts. In said drawings—

My improved warp knitting frame is provided with two rows of frame needles 1 and 2 arranged with their rear sides opposite each other and adapted to form loops from two sets of warp threads 27 and 28 the number of which is equal to the number of the needles. The threads are placed on the frame needles so as to cross each other, and they are brought into positions for being acted upon alternately by the needles of the two rows. In the course of the operation the sets of warp threads are moved in opposite directions along the rows of frame needles, and as the threads come to the ends of the rows of needles they are gradually transferred from one set to the other one which is moving in the opposite direction. Thereby the loops are formed on each side of the fabric by threads which run in the same direction, so that a fabric of uniform appearance is produced.

In order that these operations can be performed on the frame I provide sets of sinker bars 3 and 4 one for each row of frame needles 1 and 2 for locking in the row of loops which have been formed and for stripping off the row of loops to be formed. Furthermore, where the frame needles are in the form of common hooks presser bars 9 and 10 are provided for each row of frame needles for closing the hooks. Furthermore two bayonet machines 5 and 6 are provided by means of which the crossed threads are placed on the frame needles, and finally two bars 7 and 8 provided with fine pins for producing the crossing of the threads, which bars will be termed hereinafter covering machines.

Figure 1:
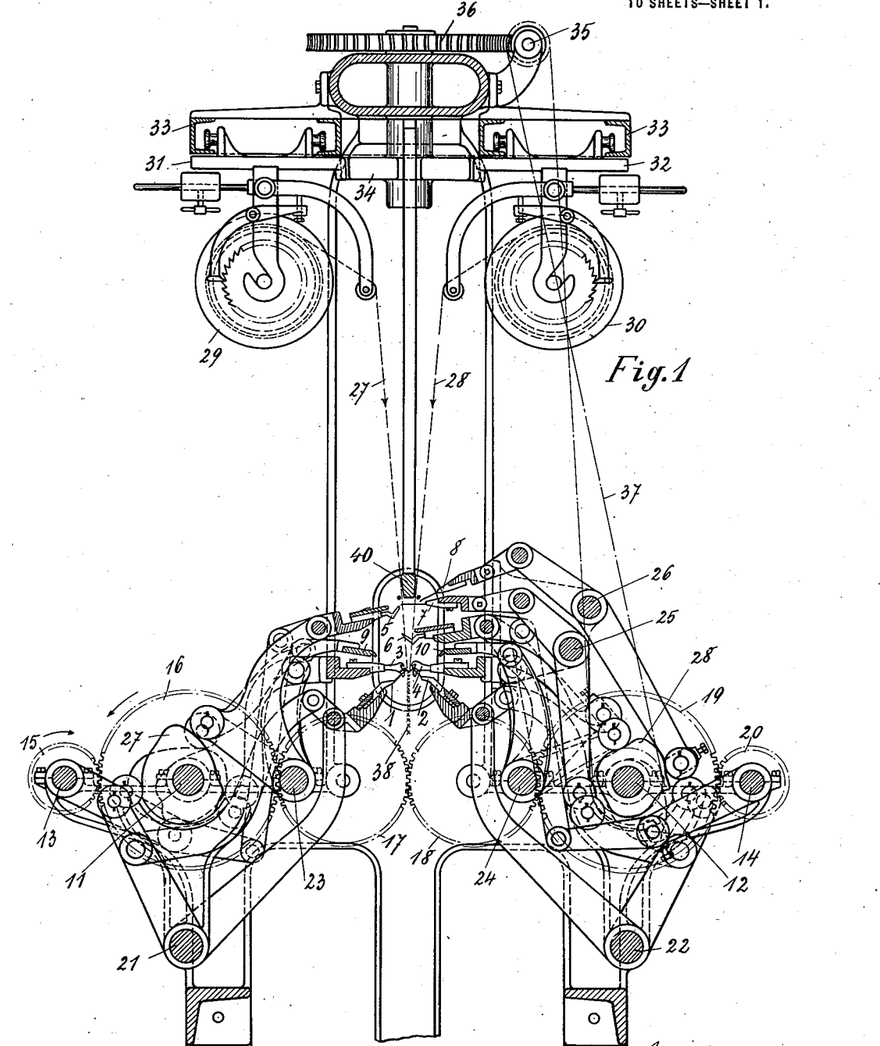
Figure 1, is a front view of the frame.
Figure 2:
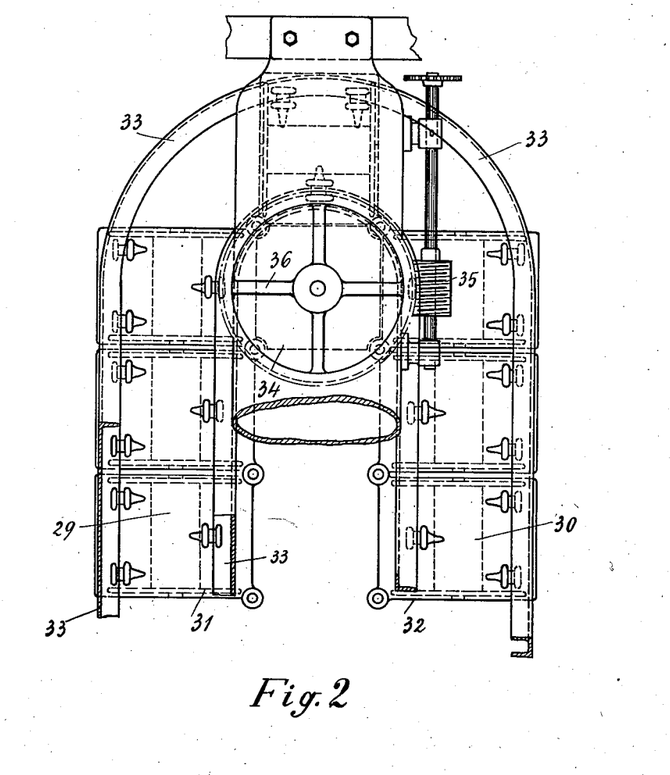
Fig. 2, is a plan view of a part of the frame.

Referring at first to Figs. 1 and 2, to the two rows of frame needles 1 and 2, the sinker bars 3 and 4, the bayonet machines 5 and 6, the covering machines 7 and 8, and the presser bars 9 and 10 the proper movements are imparted from cam disks secured to shafts 11 and 12 which are driven from a main shaft 13 by means of gear wheels 15 to 19. The levers which carry the operating members of the frame and which are driven from the cam disks 27$^a$ and 28$^a$ are mounted on shafts 13, 21, 23, 14, 22, 24, 25, and 26. The corresponding members which are located at opposite sides of the center line of the frame perform substantially the same movements. The two rows of warp threads 27 and 28 are taken from rolls 29 and 30 and directed to the rows of needles 1 and 2 in the direction of the arrow shown in Fig. 1. Between the rows of needles 27 and 28 a bar 40 is located the length of which is equal to that of the rows of frame needles 1 and 2. By means of the said bar the sets of warp threads are held apart from each other. The rolls 29 and 30 are mounted in bearings 31 and 32 which are shiftable on an annular guide 33 and depend therefrom downward. The said bearings 31 and 32 and the rolls 29 and 30 are periodically shifted so as to gradually move from one side of the frame to the opposite one, and to shift the threads 27 and 28 along the guide rail 40. Whenever a row of loops has been formed at one of the ends of the bar one or more threads pass from the front side to the rear side of the bar 40, and at the opposite end one or more threads pass over from the rear side to the front side. Thereby the threads of the two sets are gradually transferred at the ends of the rows of needles from one set to the other one. As the threads thus gradually change their positions relatively to the bar 40, they move through a continuous closed path. This is an important feature of my invention, because thereby a fabric is produced in which the threads are arranged cross-wise and in such a way that they have always the same direction of the lap. As shown the bearings 31 and 32 for the rollers are advanced by means of a driver coöperating with a worm gearing 35, 36 which is driven from the shaft 12 through a chain 37.

Figure 9:
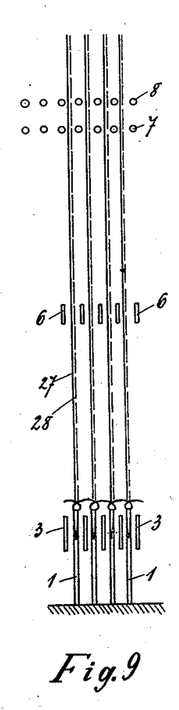
Figs. 9 to 11, are diagrammatical front views illustrating the method of crossing the threads on the frame needles.
Figure 10:
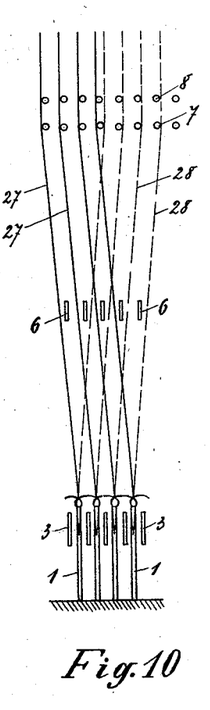

In order to place the threads on the frame needles in such a way that they cross each other, one of the covering machines, for example the machine 7, is moved with its pins passing between the threads of one set longitudinally of its length. For example it is shifted to the left in Fig. 9 with the threads 28 a distance corresponding to twice the distance of two adjacent needles, whereupon it passes with its pins also between the other threads 27 and is returned in longitudinal direction the distance corresponding to two adjacent needles. Thereby both sets of threads are shifted laterally and in opposite directions a distance corresponding to the distance of two adjacent frame needles, as is shown in Figs. 9 and 10. By means of the second covering machine 8 the threads are held in the positions imparted to them by the first named covering machine 7, when the latter is retracted from its position between the threads prior to being returned into initial position by being shifted in longitudinal direction.

Figures 3, 4:
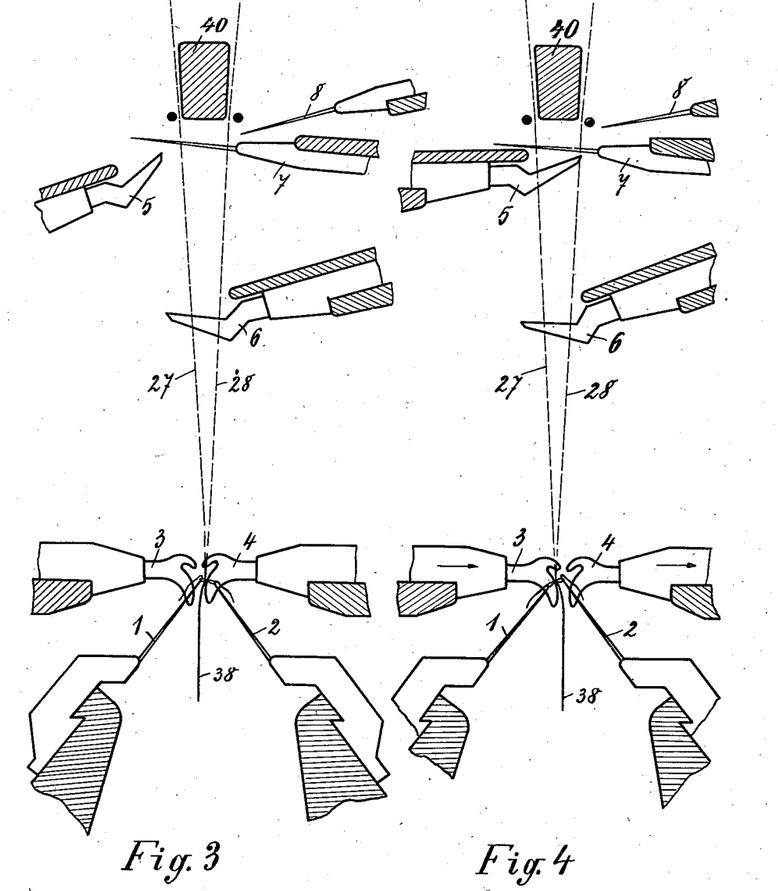
Figs. 3 to 8, are diagrammatical views showing successive steps of the operation of the frame needles, the presser bars, and the bayonet machines when forming a loop.
Figures 5, 6:
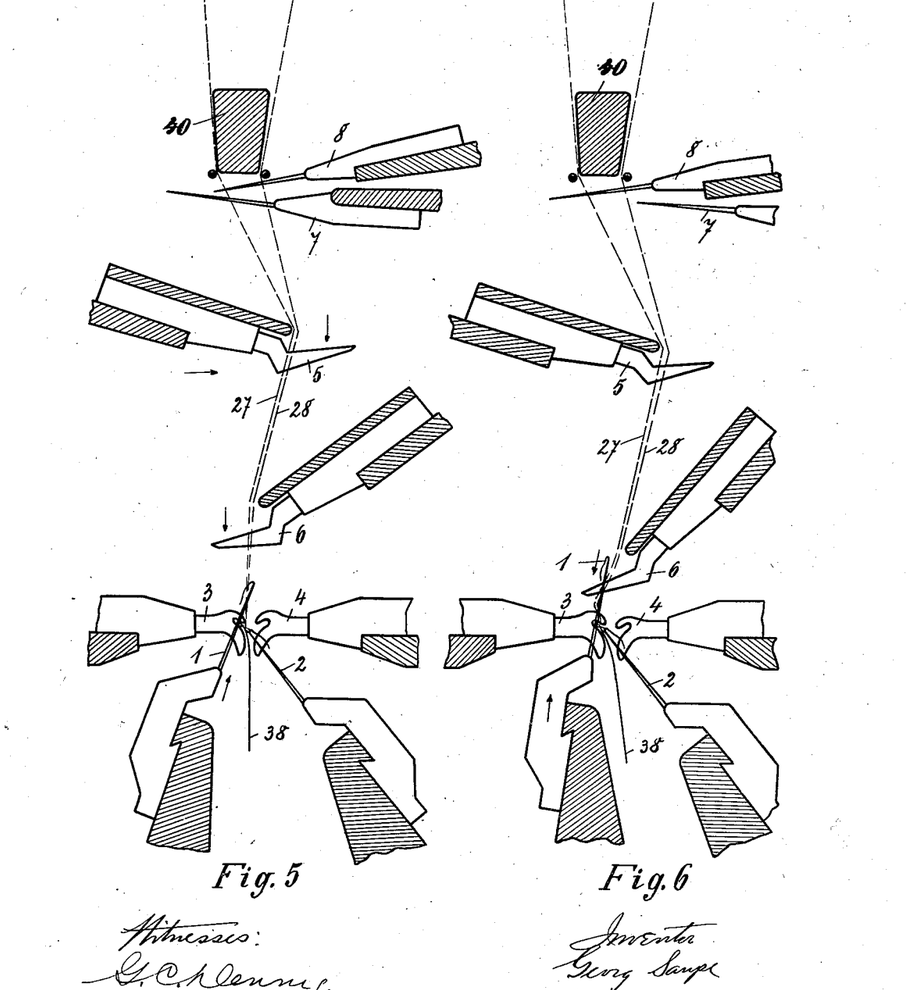
Figure 11:
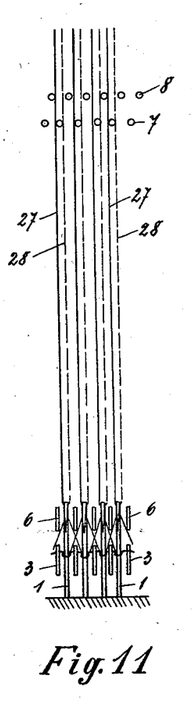

The operation of the frame shown in Figs. 1 and 2 is as follows:

In Fig. 3 the parts are shown in the initial positions, and it may be assumed that the frame needles 2 have just completed an operation and the sinkers 4 have stripped the loops formed thereby from the needles 2. Before the other row of needles 1 begins its operation, the sinkers 3 and 4 are moved in the direction of the arrow shown in Fig. 4, in order that the loops are lifted on the throats of the sinkers 3. Now the warp threads 27 and 28 which are parallel to the axes of the frame needles 1 must be crossed on the needles 1, and for this purpose the covering machine 8 and its needles are first shifted into the positions between the warp threads 28, whereupon they are shifted with the threads 28 in longitudinal direction for example twice the distance of two consecutive needles so as to pull the threads 28 laterally, whereupon they are passed between the other threads 27 and are shifted therewith in opposite direction the distance of two consecutive needles. After also the second covering machine 7 has been passed with its needles between the rows of threads, as is shown in Fig. 5, the warp threads assume the positions relatively to one another which are shown in Fig. 10. Now the bayonet machines 5 and 6 are shifted into the positions shown in Fig. 5, so that the warp threads 27 and 28 are brought to the front sides of the frame needles 1, that is to the left side thereof as shown in Fig. 5, whereupon the needles 1 are shifted upward. Now the bayonet machines 6 are moved in the direction toward the frame needles 1, as is shown in Figs. 5, 6, and 11, whereby the threads 27 and 28 are brought to cross each other and placed on the shafts and into the hooks of the frame needles 1. In the meantime the covering machine 7 has been withdrawn from its position between the threads.

Figures 7, 8:
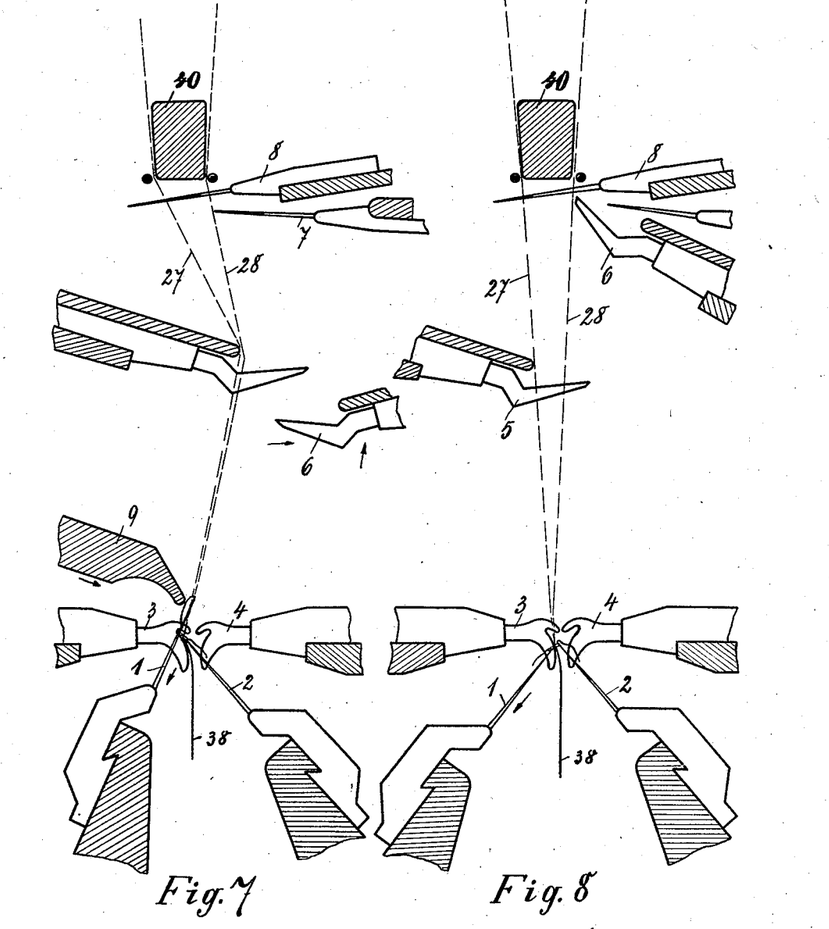

In Fig. 7 I have shown the parts in the positions in which the frame needles 1 have been moved downward and their hooks closed by means of the rail or presser bar 9, and in which at the same time one of the bayonet machines, 6 has again been retracted from its position between the warp threads and is moving upward. In Fig. 8 the frame needles are shown in their lowermost positions in which the old loops have been stripped off and new ones formed, so that the operation is finished on the row of frame needles 1.

The following row of loops must be produced on the opposite row of frame needles 2. The operation of the corresponding parts is the same as that which has just been described, with the exception, however, that the warp threads are shifted transversely of the frame needles in opposite direction and to the left in order to get on the frame needles 2, and that for this purpose the bayonet machine 6 is used which is shown at the right in the figures, while the bayonet machine 5 which is located at the left places the crossed threads on the needles 2.

The regular change in the operation of the frame needles results in a fabric which has the same loops on both sides and which is therefore an integral double fabric.

As appears from Figs. 3 to 8, in my improved warp knitting frame each of the warp machines coöperates with the opposite row of needles, the rear bayonet machines 6 placing the warp threads on the front row of needles 1, and thereafter the front bayonet machines 5 placing the threads on the rear frame needles. In the following I shall describe two modifications of this part of the frame.

According to one modification each of the bayonet machines is made to coöperate with the row of frame needles which are located on the same side therewith, and according to another modification for both rows of frame needles a single bayonet machine is provided, while the second bayonet machine is omitted.

The first named modification is illustrated in Figs. 12 to 15 and the second one in Figs. 16 to 19.

Figure 12:
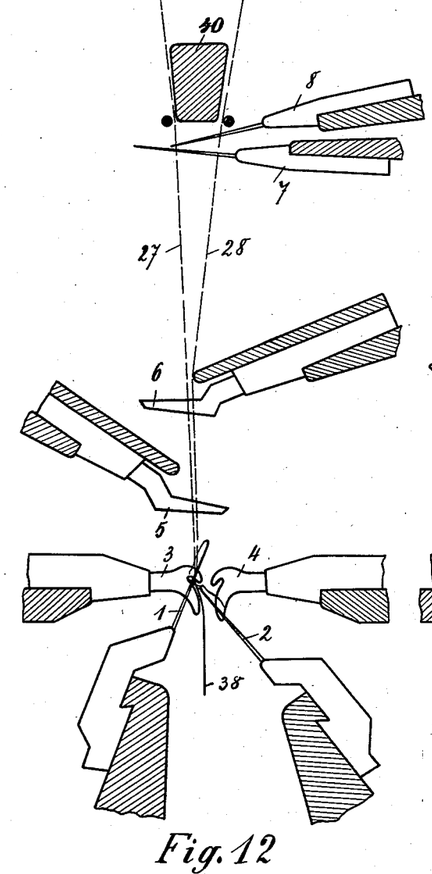
Figs. 12 to 19, are diagrammatical views similar to those shown in Figs. 3 to 8 and illustrating a modification of the method of forming the loops.
Figure 13:
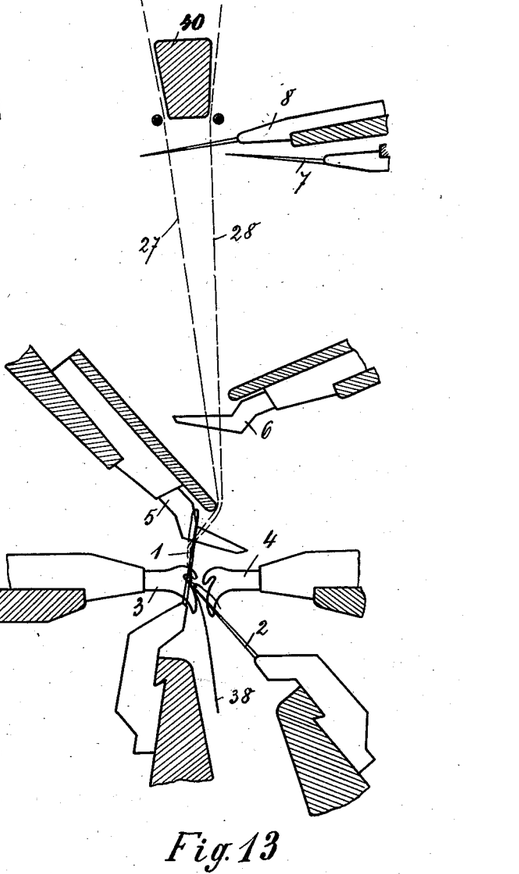
Figures 14, 15:
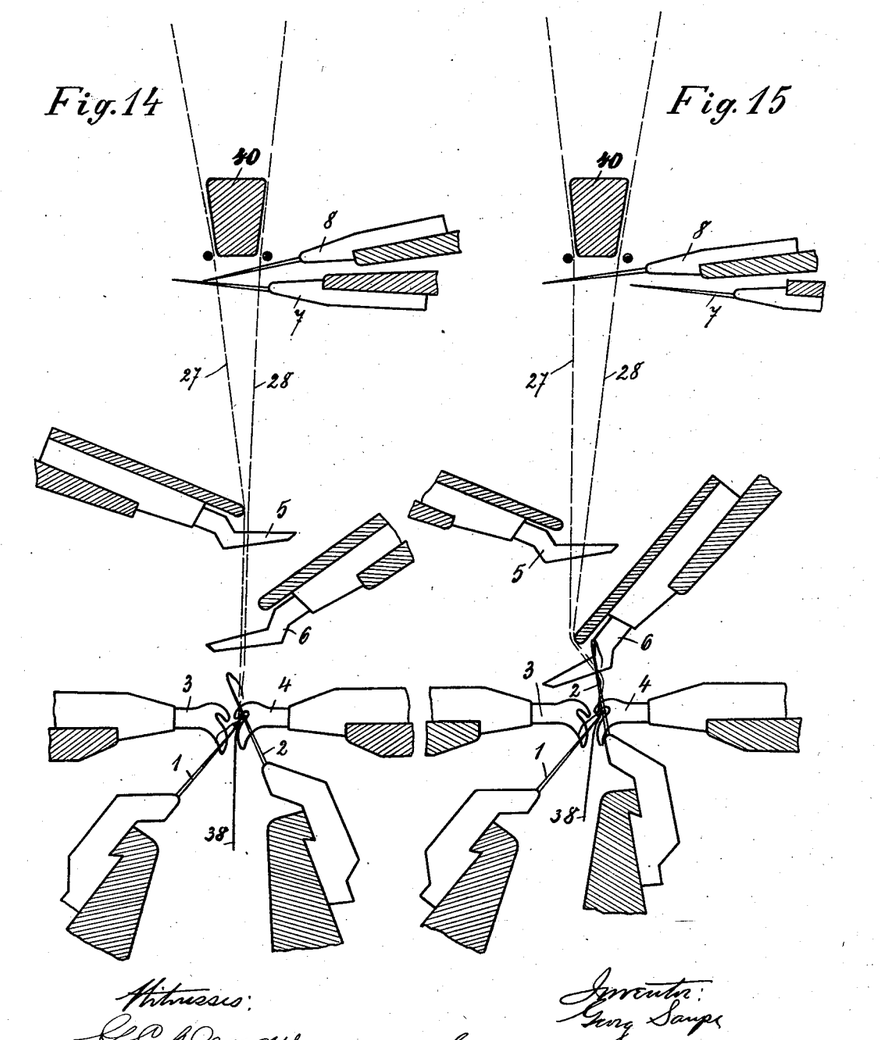
Figure 16:
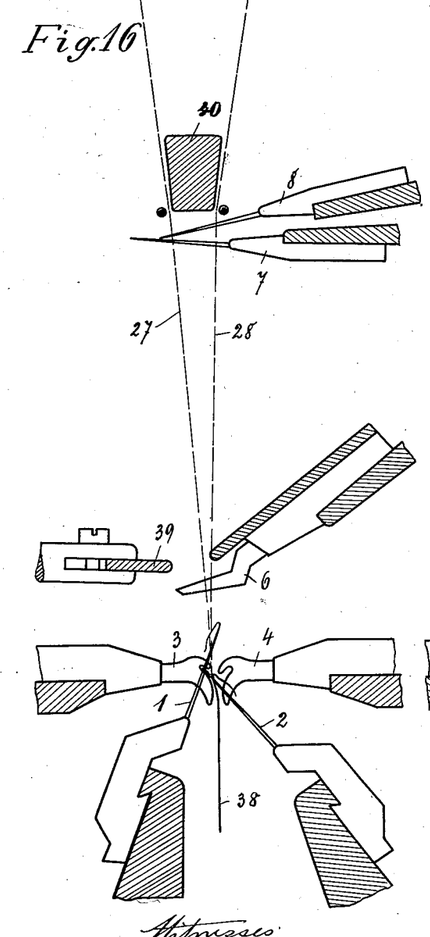
Figure 17:
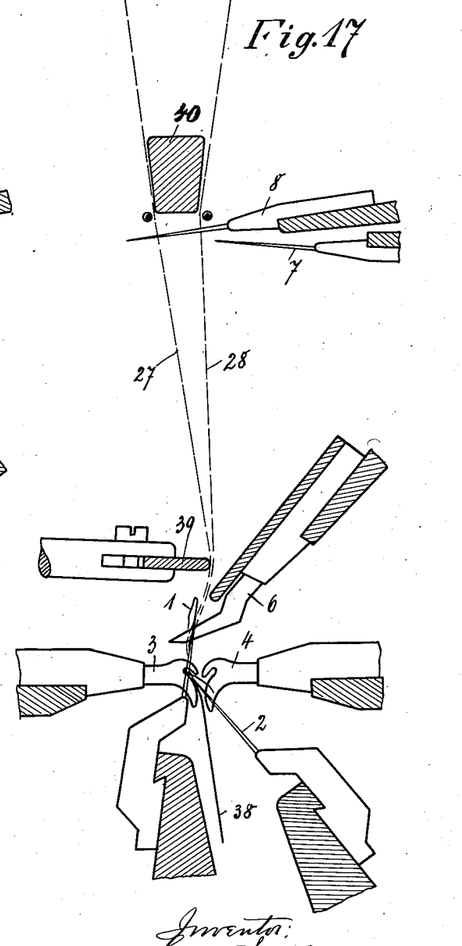
Figures 18, 19:
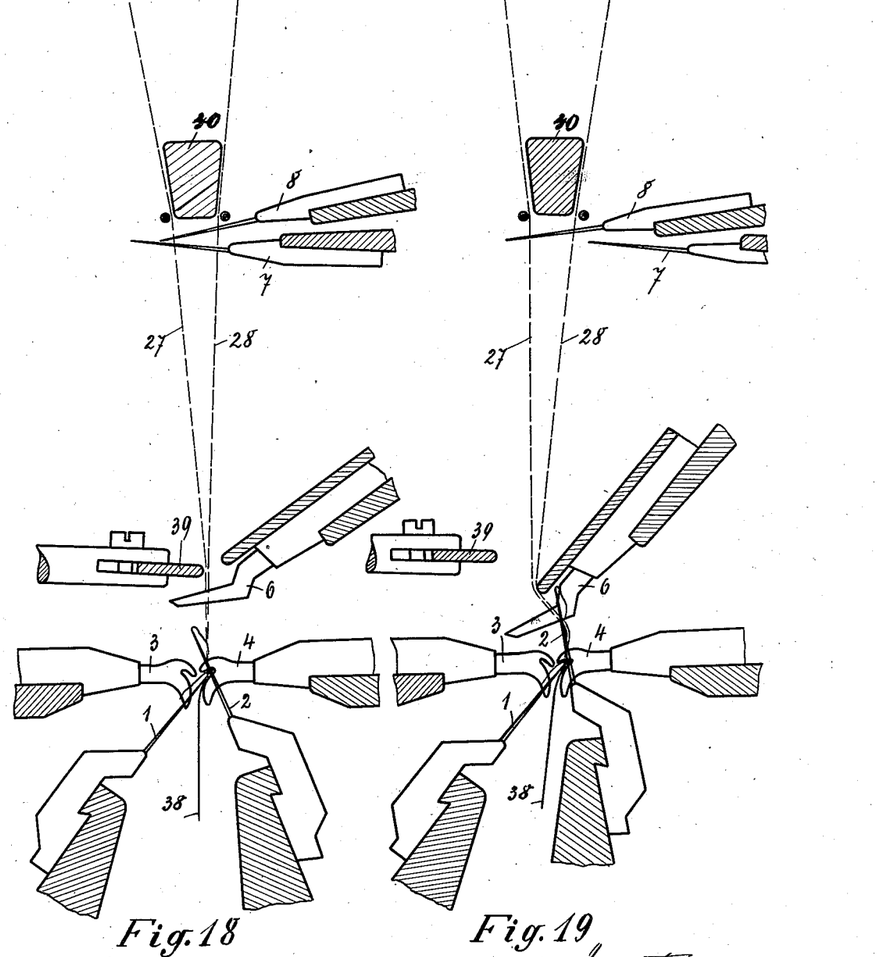

Referring at first to the modification shown in Figs. 12 to 15, when the parts are in the positions shown in Fig. 12, which corresponds to Fig. 5, the warp threads 27 and 28 must be placed on the frame needles 1. In this operation the bayonet machines 5 and 6 hold the threads in such positions, that they are in front or in Fig. 12 at the left of the said row of frame needles. After the threads have been crossed in the manner described with reference to the example shown in Figs. 3 to 11, they are placed on the frame needles by means of the bayonet frames which move for this purpose into the positions shown in Fig. 13. Now the loops are formed by means of the frame needles 1 in the same manner as has been described with reference to Figs. 3 to 11. The warp threads are placed on the rear row of frame needles 2 in the same way, with the exception, however, that the threads are placed on the frame needles not by means of the front bayonet machines 5 but by the rear bayonet machines 6. In Fig. 14 I have shown the parts in the positions in which the threads have been brought into positions between the frame needles 2, and in Fig. 15 I have illustrated the manner in which the threads are placed on the said frame needles. Thereafter the new loops are formed.

Where a single bayonet machine is provided, the mechanism is otherwise the same as in the examples shown in Figs. 3 to 15, the difference residing merely in the fact that one of the bayonet machines is omitted and that in lieu thereof a smooth rail 39 is provided which is adapted to be moved rectangularly of the warp threads, as is shown in Figs. 16 and 17. In this case the warp threads are at first brought into positions between the frame needles 1 by means of the bayonet machine 6, whereupon the threads are crossed in the manner described above. In the meantime also the frame needles 1 have moved into their uppermost positions shown in Fig. 17, the bayonet machine 6 has moved downward and has placed the crossed warp threads on the frame needles, the threads being pressed in this operation rearward by means of the rail 39. Now the operations preparatory to forming the loops on the front row of frame needles are completed. When operating the other row of needles 2 the warp threads are operated substantially in the same way. The rail 39 pushes the threads between the frame needles 2, as is shown in Fig. 18, whereupon they are crossed on the front sides of the needles by means of the covering machines 7 and 8, and finally the bayonet machine 6 pushes the threads in a direction opposite to that indicated in Fig. 18 and between the frame needles 2, as is shown in Fig. 19, in order that the threads have the proper positions on the frame needles for forming the loops.

The bayonet machines 6 and the rail 39 may also be arranged in the reverse sense from what is shown in Fig. 16, the bayonet machine 6 being on the side of the frame needles 1 and the rail 39 on the side of the frame needles 2.

I claim herein as my invention:

1. In a warp knitting frame, the combination with two rows of frame needles disposed opposite each other, of means for supplying two sets of warp threads to the needles, means coöperating with the needles to form the loops, means for bringing the threads into positions for being operated upon alternately by the rows of frame needles, means for gradually passing the threads of both sets in opposite directions along the rows of needles, and means for transferring the threads arriving at the ends of the rows of frame needles respectively from their set to the opposite one.

2. In a warp knitting frame, the combination with two rows of frame needles disposed opposite each other, of means for supplying two sets of warp threads to the needles, an elongated member parallel to the rows of frame needles and adapted to hold the seats of warp threads apart, means coöperating with the needles to form the loops, means for bringing the threads into positions for being operated upon alternately by the rows of frame needles, and means for gradually shifting the sets of warp threads around said elongated member and from one side to the other one.

3. In a warp knitting frame, the combination with two rows of frame needles disposed opposite each other, of means for supplying two sets of warp threads to the needles, sinker bars coöperating with the needles to form the loops, and for bringing the threads into positions for being operated upon alternately by the rows of frame needles, pairs of covering machines provided with needles and adapted to be shifted with their needles into positions between the warp threads and to be shifted longitudinally of the rows of frame needles for crossing the threads, means adapted to place the crossed threads on the frame needles, means for gradually passing the threads of both sets in opposite directions along the rows of needles, and means for transferring the threads arriving at the ends of the rows of frame needles respectively from their set to the opposite one.

4. In a warp knitting frame, the combination with two rows of frame needles disposed opposite each other, of means for supplying two sets of warp threads to the needles, sinker bars coöperating with the needles to form the loops, and for bringing the threads into positions for being operated upon alternately by the rows of frame needles, pairs of covering machines provided with needles and adapted to be shifted with their needles into positions between the warp threads and to be shifted longitudinally of the rows of frame needles for crossing the threads, two bayonet machines located on opposite sides of the rows of frame needles and adapted to place the crossed threads on the frame needles, said bayonet machines coöperating respectively with the row of frame needles which is located on the same side therewith, means for gradually passing the threads of both sets in opposite directions along the rows of needles, and means for transferring the threads arriving at the ends of the rows of frame needles respectively from their set to the opposite one.

GEORG SAUPE.

Witnesses:
F. E. STEGER,
W. H. MÜCKE.